US012808168B2

(12) United States Patent
Baki

(10) Patent No.: US 12,808,168 B2
(45) Date of Patent: Nov. 24, 2026

(54) DEVICE FOR CLOSING AND OPENING BY PRESSURE THE WASTE OUTLET OF A SANITARY FIXTURE

(71) Applicant: Vinzia Fratelli S.p.A., Briga Novarese (IT)

(72) Inventor: Gyozo Janos Baki, Bolzano Novarese (IT)

( * ) Notice: Subject to any disclaimer, the term of this patent is extended or adjusted under 35 U.S.C. 154(b) by 175 days.

(21) Appl. No.: 18/782,352

(22) Filed: Jul. 24, 2024

(65) Prior Publication Data

US 2025/0034851 A1 Jan. 30, 2025

(30) Foreign Application Priority Data

Jul. 26, 2023 (IT) ........................ 102023000015756

(51) Int. Cl.
*E03C 1/23* (2006.01)
*F16K 31/56* (2006.01)

(52) U.S. Cl.
CPC ................ *E03C 1/23* (2013.01); *F16K 31/56* (2013.01)

(58) Field of Classification Search
CPC .......... A47K 1/14; E03C 1/2302–2308; E03C 1/26–264; E03C 2001/2311–2317
See application file for complete search history.

(56) References Cited

U.S. PATENT DOCUMENTS 4,339,832 A * 7/1982 Cuschera .................. E03C 1/22 4/286
5,265,281 A * 11/1993 McAlpine ............... E03C 1/262 4/290
6,880,179 B2 * 4/2005 Wang ........................ A47K 1/14 4/286
9,095,239 B2 * 8/2015 Laera .................... E03C 1/2306
10,815,652 B2 * 10/2020 Ball ........................ E03C 1/264
(Continued)

FOREIGN PATENT DOCUMENTS

AU 2020101252 8/2020
EP 1067245 * 1/2001 ........... E03C 1/2306
(Continued)

OTHER PUBLICATIONS

European Patent Office, Search Report, Dec. 9, 2024.
Italian Patent and Trademark Office, Search Report, Feb. 12, 2024.

*Primary Examiner* — David P Angwin
*Assistant Examiner* — Nicholas A Ros
(74) *Attorney, Agent, or Firm* — Themis Law

(57) ABSTRACT

A device for closing and opening by pressure the waste outlet of a sanitary fixture adapted to be housed inside a drain includes a hollow tubular body configured to be associated integrally with a plug, and a stem at least partially housed inside the hollow tubular body. A hemispherical, cage-shaped element with a plurality of arms houses the hollow tubular body and the stem, and an upper annular base faces the plug and a lower annular base to which a free end of the stem is connected, An annular gasket is fitted externally on the tubular wall of the hollow tubular body and is adapted to be positioned in abutment against the inner wall of the upper annular base to hermetically close the entrance of the drain, when the device is housed sealingly in the drain and the hollow tubular body is in the closed position.

13 Claims, 12 Drawing Sheets

(56) References Cited

U.S. PATENT DOCUMENTS

| | | | | |
|---|---|---|---|---|
| 11,680,397 B2 * | 6/2023 | Ahuja | .................. | E03C 1/2306<br>4/295 |
| 2011/0297865 A1 | 12/2011 | Gellert | | |

FOREIGN PATENT DOCUMENTS

| | | | | |
|---|---|---|---|---|
| EP | 1338707 | | 8/2003 | |
| EP | 1568823 | * | 8/2005 | ............... E03C 1/23 |
| EP | 3202989 | * | 8/2017 | ........... E03C 1/2306 |

* cited by examiner

DEVICE FOR CLOSING AND OPENING BY PRESSURE THE WASTE OUTLET OF A SANITARY FIXTURE

FIELD OF THE INVENTION

The present invention relates to a device for closing and opening by pressure a waste outlet of a sanitary fixture such as a washbasin, sink, bidet, bathtub, shower or other basin for collecting a liquid.

BACKGROUND OF THE INVENTION

In the sanitary fixture sector, it is known to use closing plugs of the waste outlet hole, hereinafter for brevity even just "waste outlet", of the sanitary fixture which comprise a movable plug, typically mushroom-shaped, which couples to a fixed drain, inserted or otherwise connected to a waste outlet hole provided on the sanitary fixture. The mushroom-shaped plug is coupled to the fixed drain by means of a closing and opening mechanism which guides its ascent and descent between a raised or open position, in which the plug does not hinder the outflow of water through the waste outlet, and a lowered or closed position, in which the plug occludes the waste outlet.

The mechanisms for driving the plug comprises lever mechanisms or snap-latch mechanisms.

Examples of such snap-latch mechanisms are described in EP1338707 (FIGS. 1 and 2).

As is known, a drain, which can be associated with said plugs, comprises a substantially cylindrical body housed in a hole of the bathtub or sink and communicating with a waste outlet duct.

The drain generally ends at the bottom with a grate and at the top with a flange, which delimits the entrance for the passage of water or other liquid in the drain towards the waste outlet duct.

The sealing occlusion of the drain flush with or near the flange is preferably achieved by the arrangement of a gasket associated with the plug and arranged peripherally at a side wall of the closing plug so that it can abut against the drain and hydraulically close it, cooperating with the inner edge of the flange or the substantially cylindrical body, when the head of the plug is flush with, or below said flange.

The document EP 3202989 discloses an opening and closing device with a movable plug provided with a seal which is coupled with a stationary drain inserted into a draining hole of a sanitary device. The seal abuts on the drain and can close it.

The document EP 1067245 discloses a drain cup positioned in an opening of a basin with a rotatable cap for axially moving a closure member from a closed position to an open position and vice versa.

The document AU 2020101252 discloses a pop-up plug assembly in which an annular seal of the plug cap is located and sized to contact the annular cavity of the plug housing (drain) received within an opening of the bathtub or basin and connected at its bottom end to the waste outlet pipe.

In order to ensure the perfect occlusion of the drain, it must have an inner surface, against which the gasket abuts, which is absolutely not rough and, to achieve this lack of roughness or imperfections, it is necessary that both the finishing process of the drain and the subsequent refinishing processes such as polishing, chrome-plating, brushing, painting, are carried out perfectly.

The fact that the drain may have an inner abutment surface of the gasket which is not perfectly smooth is a drawback, as it does not allow a perfect sealing closure of the waste outlet, resulting in an oscillation of the water/liquid level in the tank of the sanitary fixture.

Furthermore, the closing plug normally protrudes above the body of the drain, in the opened condition of the water/liquid waste outlet, and this is considered an drawback as it can be both an obstructive element (e.g., if the plug is placed in a tub which is also used as a shower), which can also be inadvertently pressed in the closed position of the waste outlet, and an aesthetically unattractive element.

Another drawback is the negative aesthetic impact due to the presence of the what is called the 'overflow', i.e. the hole made in the sanitary fixture, e.g., in the side wall of the bathtub or washbasin and in connection with the waste outlet duct, having the purpose of letting the water/liquid flow out when it reaches a certain protection level, preventing it from overflowing beyond the sanitary fixture itself.

Drains with an integrated overflow system are known, i.e. drains with one or more overflow holes and a plug which rises when the water/liquid level in the sanitary fixture reaches a certain level, letting the water flow out of said hole(s) present on the drain to then close again when the water falls below the protection level. The plug can be opened by the user with simple pressure.

However, said known drains are bulky, with a cylindrical body of high length which does not allow the positioning thereof in washbasins with a low height where the overflow hole would be located too close to the lower opening of the water outlet of the drain itself.

In fact, the closing/opening mechanism of the plug of said drains does not allow to have the overflow hole(s) positioned near the flange of the drain.

SUMMARY OF THE INVENTION

In light of the above, the main task of the present invention is to provide a device for closing and opening by pressure a waste outlet of a sanitary fixture, provided with a drain, which is capable of obviating the above-mentioned drawbacks.

Within the scope of such a task, it is the aim of the present invention to devise a device for closing and opening by pressure a waste outlet of a sanitary fixture in which the hydraulic seal of the waste outlet is independent of the quality of the inner surface of the drain.

Another aim of the present invention is to provide a closing and opening device which can also be applied to drains inserted in washbasins with reduced vertical extensions (heights).

It is another aim of the present invention to devise a device for closing and opening by pressure a waste outlet of a sanitary fixture which can be easily applied to existing drains already inserted in the waste outlet of a sanitary fixture.

Another aim of the present invention is to achieve the objectives set out above in the context of a simple, rational construction solution with high and lasting reliability of use.

The aims of the present invention are achieved by a device for closing and opening by pressure a waste outlet of a sanitary fixture according to the attached claim 1.

The Applicant has advantageously researched and identified a specific combination of features which allows to have a closing and opening device by pressure of a waste outlet of a sanitary fitting which can be easily applied to any drain and allows a perfect closing of the waste outlet itself, avoiding direct contact between the gasket, which moves longitudinally to ensure the opening and closing of the drain entrance, and the drain itself, which may be subject to imperfections, corrosion or encrustations which prevent the gasket from sealingly adhering thereto.

The device allows having a perfect seal which is constant over time without any special maintenance requirements.

Furthermore, the device which is the subject matter of the present invention is easily installable and removable for cleaning, maintenance and inspection of the waste outlet and drain of the sanitary fixture and does not require the presence of guide flaps adapted to slide along the inner walls of the drain, which flaps are used to keep the known closing and opening devices centered on the drain of the waste outlet.

A further subject matter of the present invention is an assembly comprising said device and a drain housed in the waste outlet hole provided on the sanitary fixture.

Further features of the preferred embodiments of the device for closing and opening by pressure a waste outlet of a sanitary fixture according to the present invention are the subject matter of the dependent claims.

BRIEF DESCRIPTION OF THE DRAWINGS

Further features and advantages of the present invention will be more evident from the following description of some preferred but not exclusive embodiments thereof made with reference to the appended drawings.

In such drawings.

DETAILED DESCRIPTION OF EMBODIMENTS OF THE INVENTION

Figure 1:
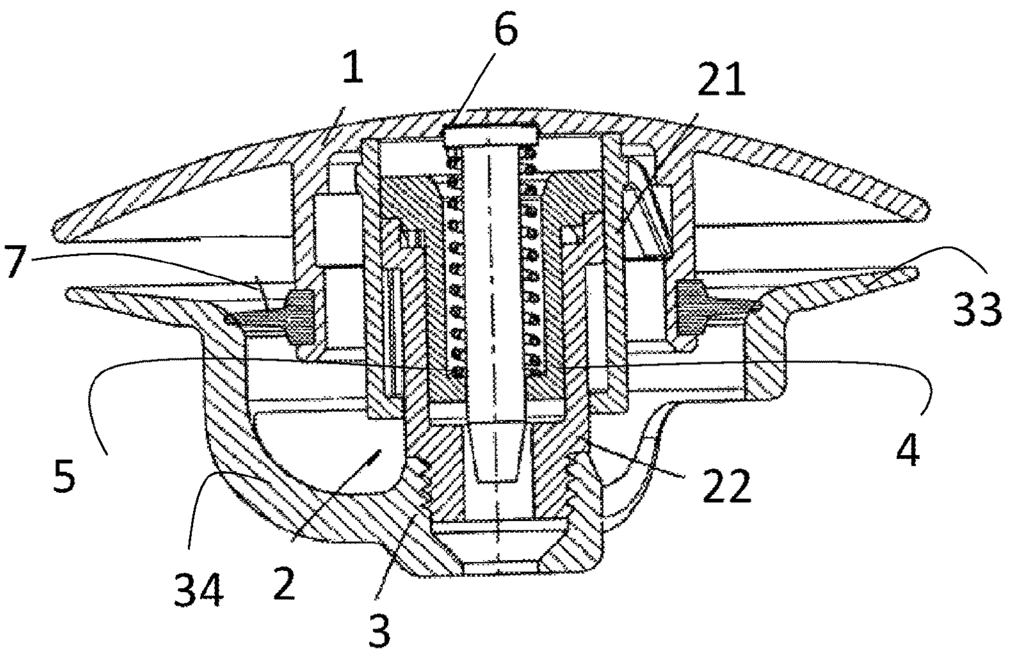
PRIOR ART Fig.1
FIG. 1 is a sectioned view in elevation of a closing and opening device in association with a drain of a bathtub according to the prior art, in the closed waste outlet position.

For the illustration of the drawings, use is made in the following description of identical numerals or symbols to indicate construction elements with the same function. Moreover, for clarity of illustration, certain references may not be repeated in all drawings.

While the invention is susceptible to various modifications and alternative constructions, the preferred embodiments are shown in the drawings and are described hereinbelow in detail. It must in any case be understood that there is no intention to limit the invention to the specific embodiment illustrated, but, on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "comprises" and "includes" means "comprises or includes, but not limited to", unless otherwise indicated.

Within the scope of the present description and in the following claims, the terms "lower" and "upper" refer to the normal conditions of use of the device 100 when associated with the sanitary fixture.

Figure 2:
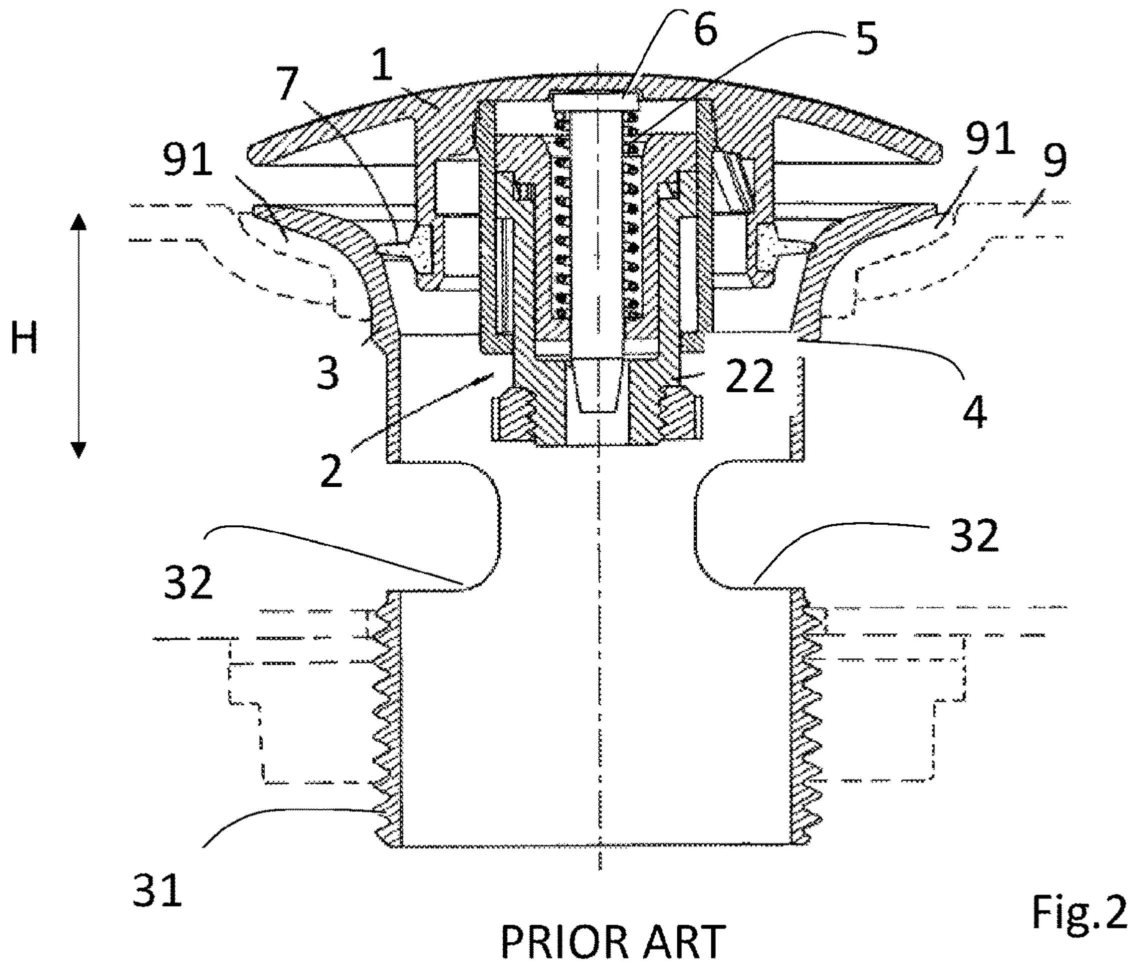
Fig.2 PRIOR ART
FIG. 2 is a sectioned view in elevation of a closing and opening device in association with a drain of a sink according to the prior art, in the closed waste outlet position.

FIGS. 1 and 2 show a plug for sanitary fixtures according to prior art in the closed condition.

The plug 1 is visible in the figures, comprising a mechanism for opening and closing 2 the waste outlet with a movable part 21 adapted to be fixed to the plug 1 and a fixed part 22, on which the movable part 21 slides axially, screwed onto the drain 3. A rotatable part 4 with an axial hole for housing a spring 5 and a pin 6 for guiding the spring 5 complete the mechanism.

The plug 1 comprises a gasket 7 which, in the closed condition, is positioned abutting against the inner wall of the flange 33 of the drain 3.

The figures differ in the shape of the drain 3: FIG. 1 shows a drain 3 with reduced longitudinal extension and grate 34 at the end opposite that in which the flange 33 is present, typically used for bathtub waste outlets, while FIG. 2 shows a drain 3 from a sink with external thread 31, side holes 32 which put the waste outlet of the sanitary fixture in communication with the ducts obtained in the cavity of the ceramic bowl 9, connected to the overflow outlet. The number 91 is used to indicate a sealing gasket between the flange of the drain 3 and the upper surface of the ceramic bowl 9.

With reference to the appended FIGS. 3 to 15, a device is described for opening and closing by pressure a sanitary fixture waste outlet S according to the present invention, indicated overall with 100.

This opening and closing device 100 is adapted to be housed in the body 201 of a drain 20 to open and close the entrance I and thus allow or prevent the passage of water or other liquid towards the waste outlet pipe (not depicted).

The drain 20 comprises a hollow cylindrical body 201 which can be housed in a hole (waste outlet S) in a sanitary fixture such as a bathtub, sink, washbasin or the like, which ends at the bottom with an opening 202 which can be connected to the waste outlet pipe (not depicted) and at the top with an annular flange 203 delimiting the entrance I for the passage of water or other liquid into the hollow cylindrical body 201.

The opening and closing device 100 comprises a hollow tubular body 101, associated or associable integrally at an end thereof with a plug or head 102 or cover 115, a stem 103 at least partially housed inside the hollow tubular body 101.

The hollow tubular body 101 comprises a tubular wall 110 delimited at a first end by a lower opening 117 and at a second end, opposite the first, by an upper opening 116, in which said stem 103 engages the lower opening 117 and the upper opening 116 is at least partially engaged by said plug 102, 115, said hollow tubular body 101 being translatable with respect to the stem 103 along a longitudinal driving axis A of said device 100 between a first position of balance or of closure of the waste outlet S, in which a larger portion of the stem 103 is stably inserted into the hollow tubular body 101, and a second position of balance or of opening of the waste outlet S, in which a smaller portion of the stem 103 is stably inserted into the hollow tubular body 101.

Advantageously, said device 100 comprises a hemispherical cage-like element 30 with several arms 301 within which said hollow tubular body 101 and said stem 103 are housed.

Said hemispherical cage-like element 30 is provided with an upper annular base 303 facing the plug 102, 115 and a lower annular base 302 to which said stem 103 is connected, opposite said upper annular base 303. An annular gasket 40 is externally fitted on the tubular wall 110 of said hollow tubular body 101 adapted to position itself in abutment against the inner wall 313 of said upper annular base 303 to hermetically close the entrance I of the drain 20 when said device 100 with the hemispherical cage-like element 30 is positioned in the drain 20 and said hollow tubular body 101 is in the closed position.

Said hemispherical cage-like element 30 can in fact be positioned sealingly inside the body 201 of the drain 20.

Each of said arms 301 comprises at least two segments, i.e. at least a first segment 311 departing from the lower edge of the upper annular base 302 and extending vertically towards the lower annular base 303, parallel to the longitudinal driving axis A, and at least a second inclined or folded segment 312 joining said first segment 311 to said lower annular base 302.

In particular, said second segments 312 are folded towards the center of said lower annular base 302 of said hemispherical cage-like element 30.

Said first segments 311 of said arms are shaped so as to be positioned in abutment against the inner wall 211 of the drain 20 when said hemispherical cage-like element 30, and thus said device 100, are positioned inside a drain 20.

Advantageously, the outer wall of the arms 301, in particular at least of said first segments 311, is arched in such a way as to facilitate the positioning in abutment against the inner wall 211 of the hollow cylindrical body 201 of the drain 20.

According to an embodiment, the arms 301 are four and are arranged perpendicular to each other in such a way as to improve the stability of the hemispherical cage-like element 30 positioned inside the hollow cylindrical body 201 of the drain 20.

Figure 9:
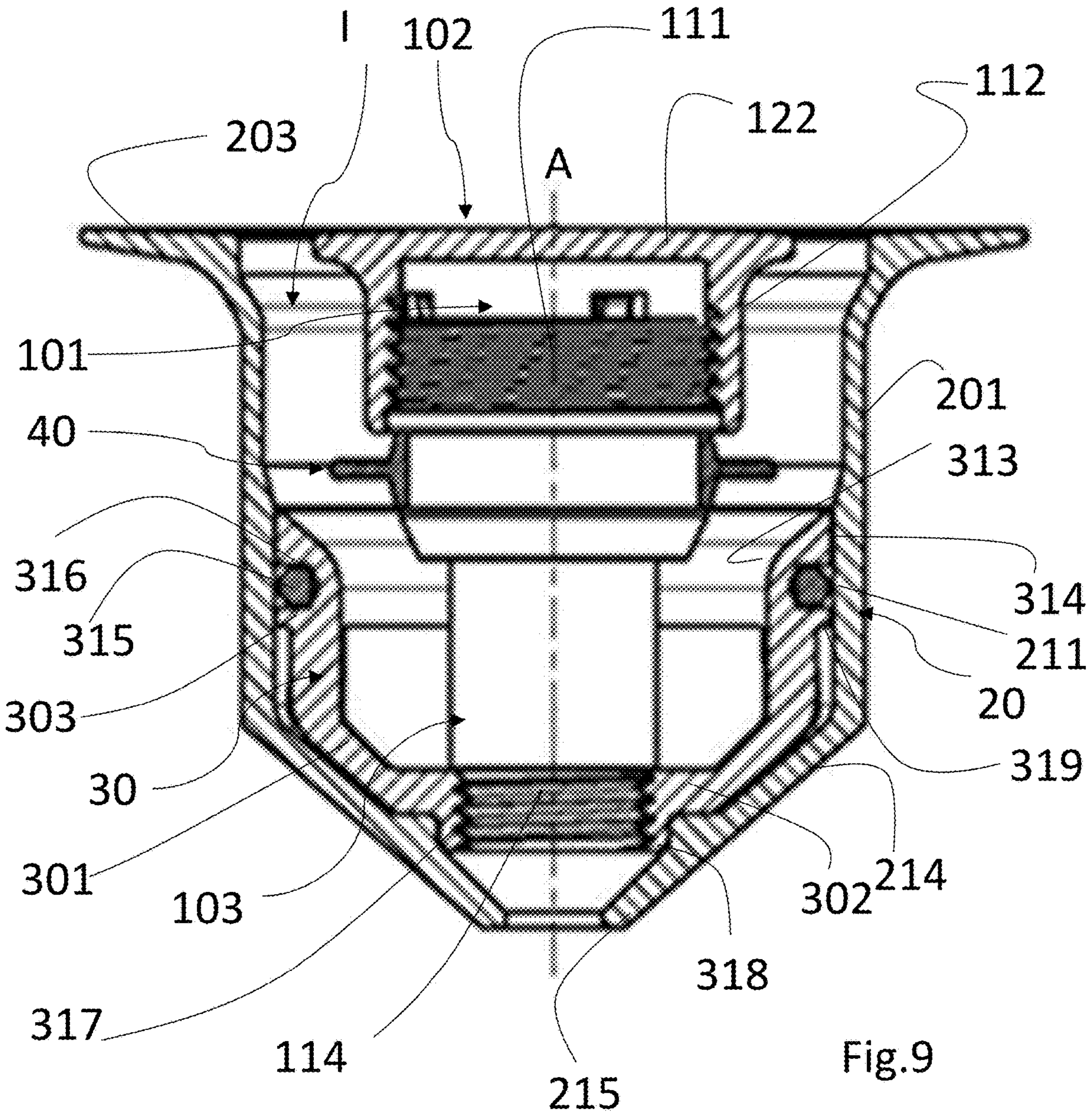
FIGS. 9 and 10 are sectioned views in elevation of a closing and opening device in association with a drain of FIG. 3, respectively in the opened and closed waste outlet position.

As illustrated in FIG. 9, depending on the type of drain 20 in which the hemispherical cage-like element 30 is housed, also or only said second segments 312 can be in abutment against portions of the inner wall of the drain 20.

The upper annular base 303 has a larger diameter than said lower annular base 302.

As visible in the figures, the radius (or diameter) of the upper annular base 303 is greater than the radius (or diameter) of the hollow tubular body 101 and the stem 103 to allow the latter to be housed inside the hemispherical cage-like element 30.

In turn, the radius (or diameter) of the cylindrical body 201 of the drain 20 is greater than the radius (or diameter) of the upper annular base 303 to allow the housing of the hemispherical cage-like element 30, and consequently the hollow tubular body 101 and stem 103, in the drain 20 itself.

Furthermore, the two upper and lower annular bases 302 and 303 lie on planes which are spaced apart and parallel with each other.

Figure 3:
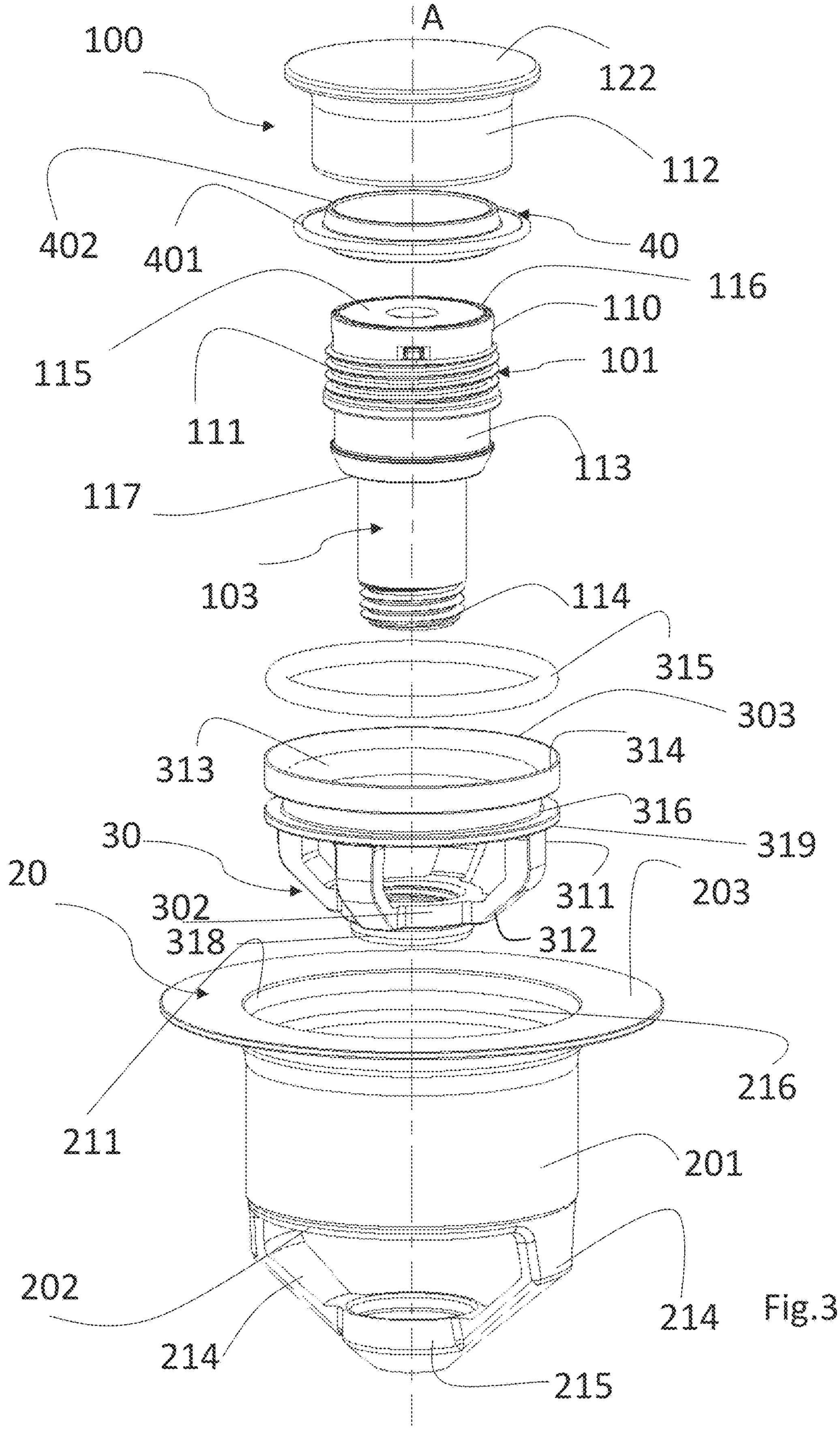
FIG. 3 is an exploded perspective view from above of a closing and opening device of the present invention associated with a drain with a hole for inserting a locking screw.
Figure 4:
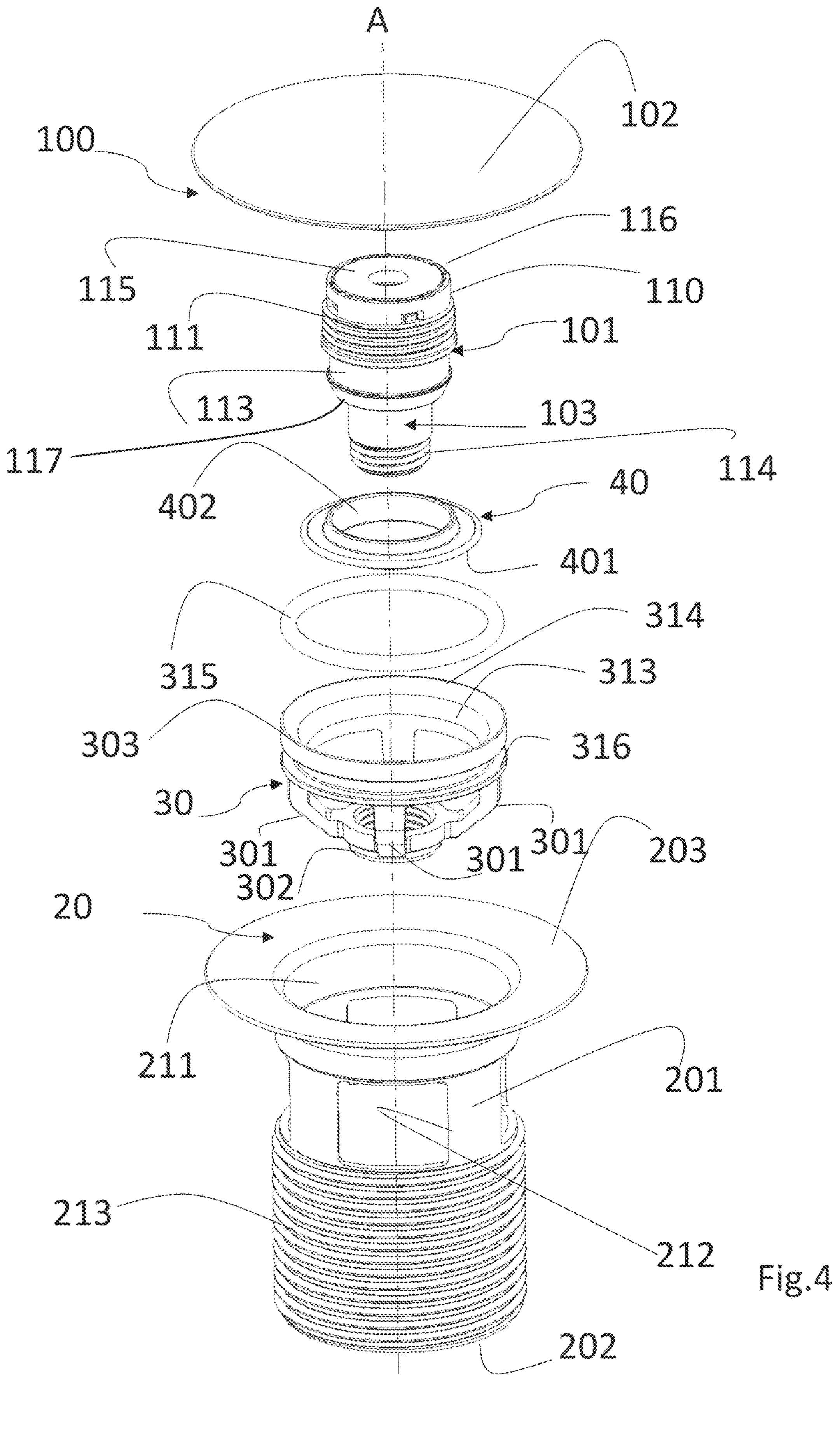
FIG. 4 is an exploded perspective view from above of a closing and opening device of the present invention associated with a drain with a partially threaded outer surface.

As can be seen from the figures, e.g. FIGS. 3 and 4, at least said hollow tubular body, said stem 103, said hemispherical cage-like element 30 with their respective lower 302 and upper 303 annular bases are symmetrical with respect to a single central axis, which is also the longitudinal driving axis A.

Advantageously, the stem 103 and the hollow tubular body 101 can be coupled to each other so as to be able to make relative translations with respect to one another along the driving axis A, but not be able to make relative rotations around the axis A.

In particular, to allow the filling and emptying of the sanitary fixture, the sealing element or annular gasket 40, depending on its position, is suitable for occluding access to the waste outlet engaged by the hemispherical cage-like element 30 and by the drain 20, thereby preventing the outflow of liquid through the waste outlet of the sanitary fixture when the device 100 is in the closed position, or leaving access to the waste outlet free, thereby allowing the outflow of liquid when the device 100 is in the opened position.

The sealed occlusion of the drain 20 is made by means of the gasket 40 acting on the hemispherical cage-like element 30.

According to a non-illustrated embodiment, the gasket 40 is associated with the plug 102 or according to a preferred embodiment the gasket 40 is associated with the hollow tubular body 101 and is arranged peripherally to a tubular wall 110 of said hollow tubular body 101 so as to be able to abut against the hemispherical cage-like element 30, at the upper annular base 303, positioned in the drain 20 and close the entrance by sealing it hydraulically when the device 100 is in the closed position.

Figure 5:
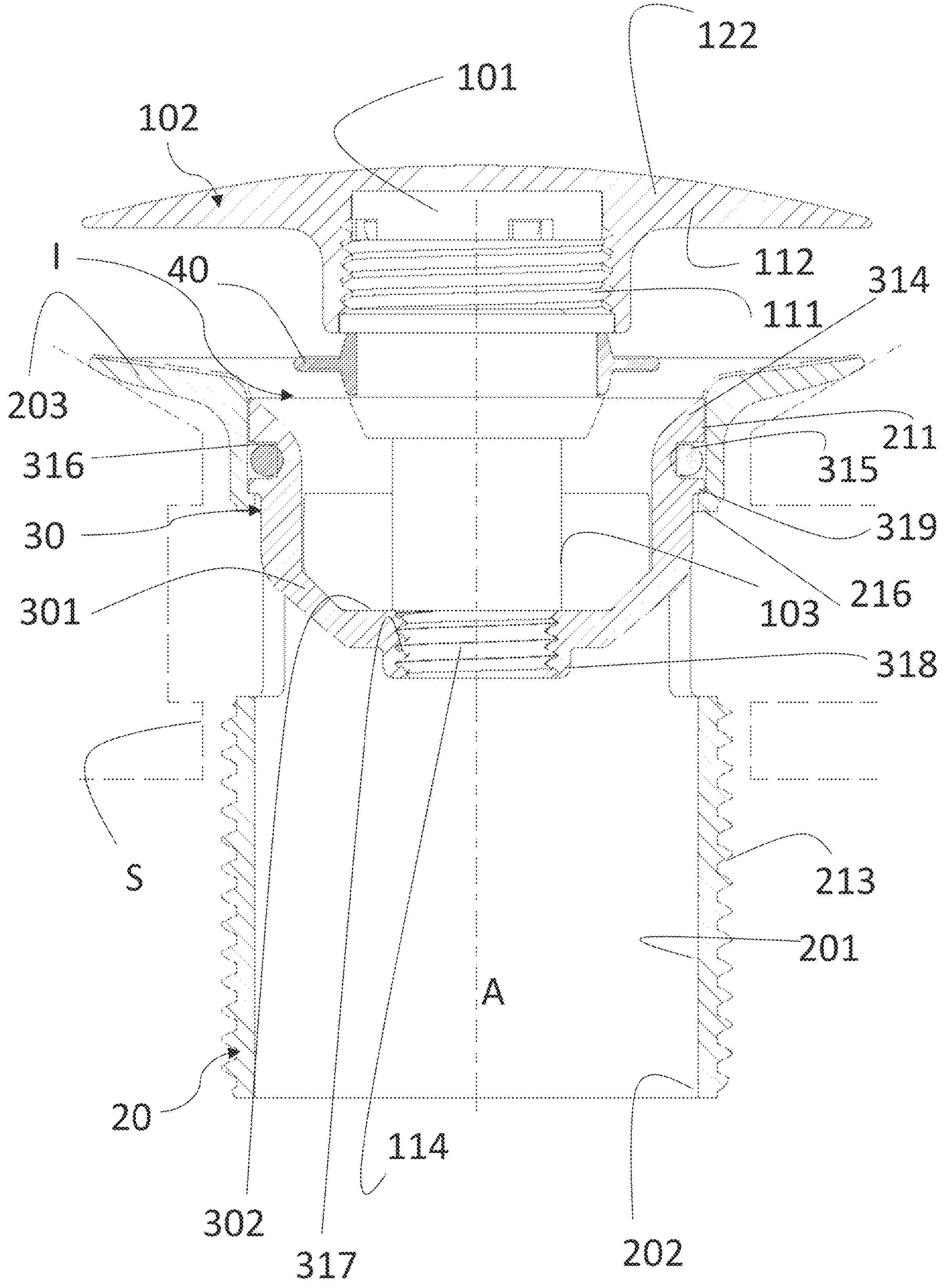
FIGS. 5 and 6 are sectioned views in elevation of a closing and opening device in association with a drain of FIG. 4, respectively in the opened and closed waste outlet position.
Figure 6:
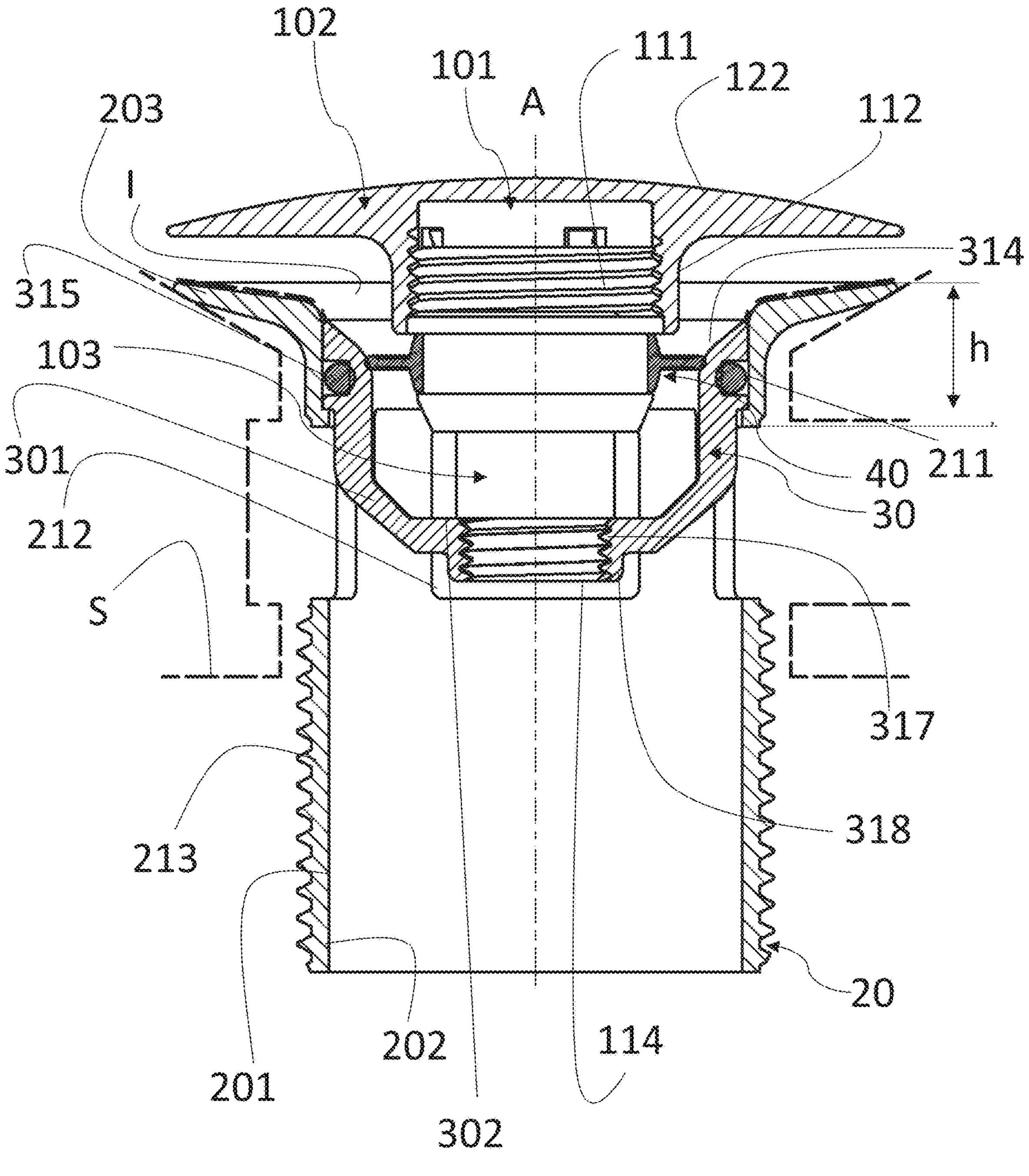
Figure 7:
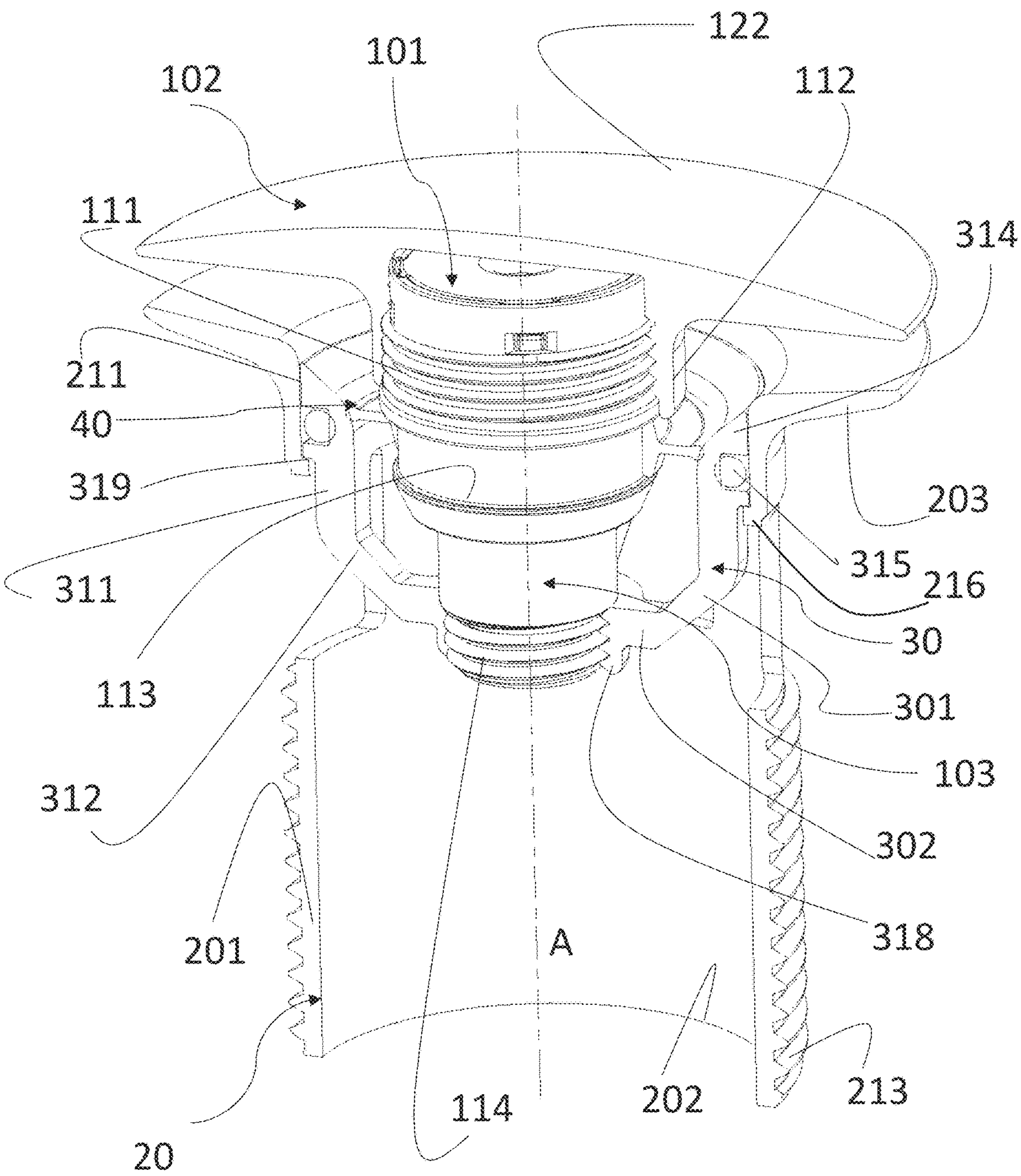
FIG. 7 is a partially sectioned perspective view of the device with the drain of FIG. 6.
Figure 8:
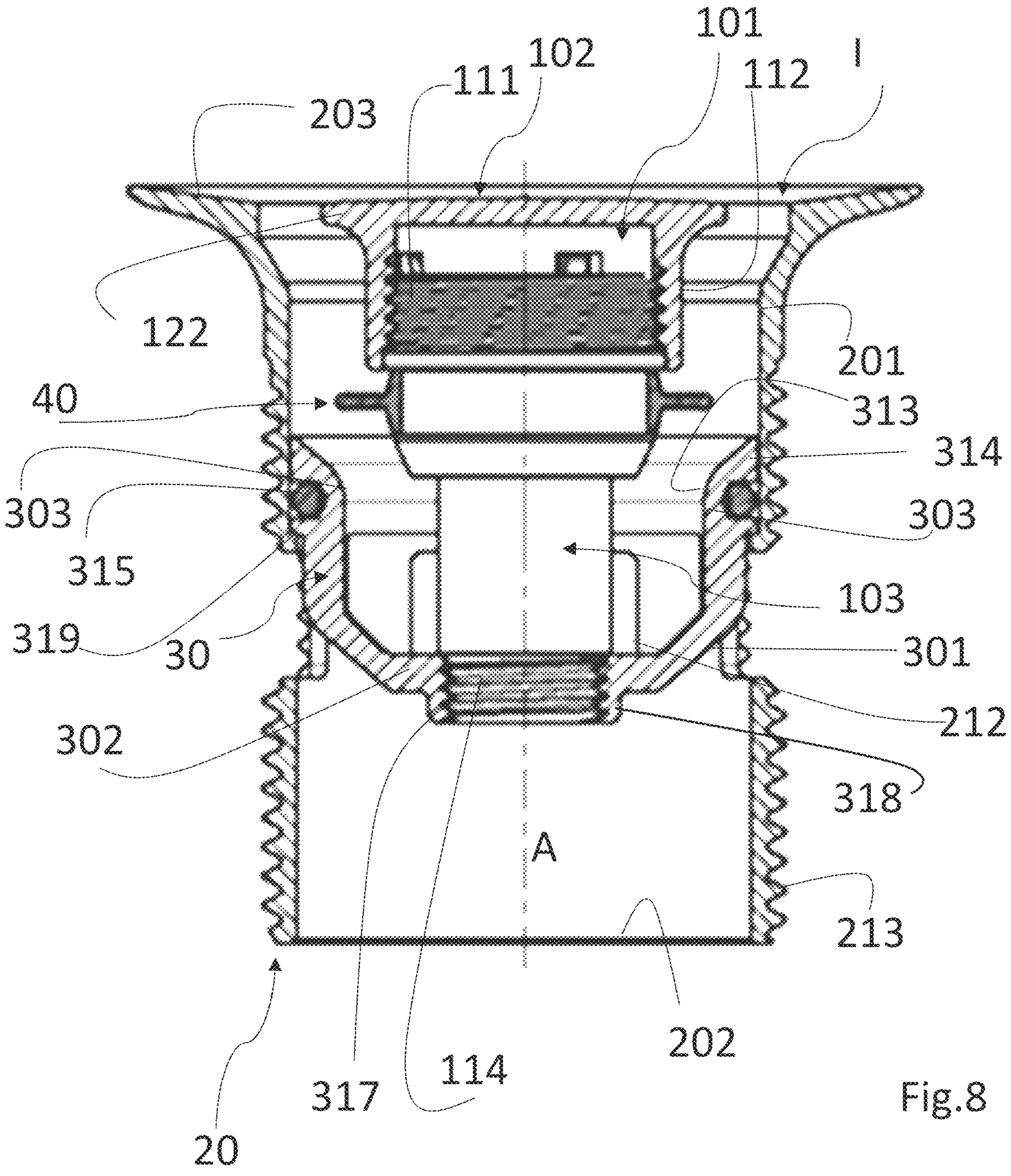
FIG. 8 is a partially sectioned view of a variant of the closing and opening device which is the subject matter of the present invention with a plug positioned flush with the flange of the drain of FIG. 6 in the opened waste outlet position.
Figure 10:
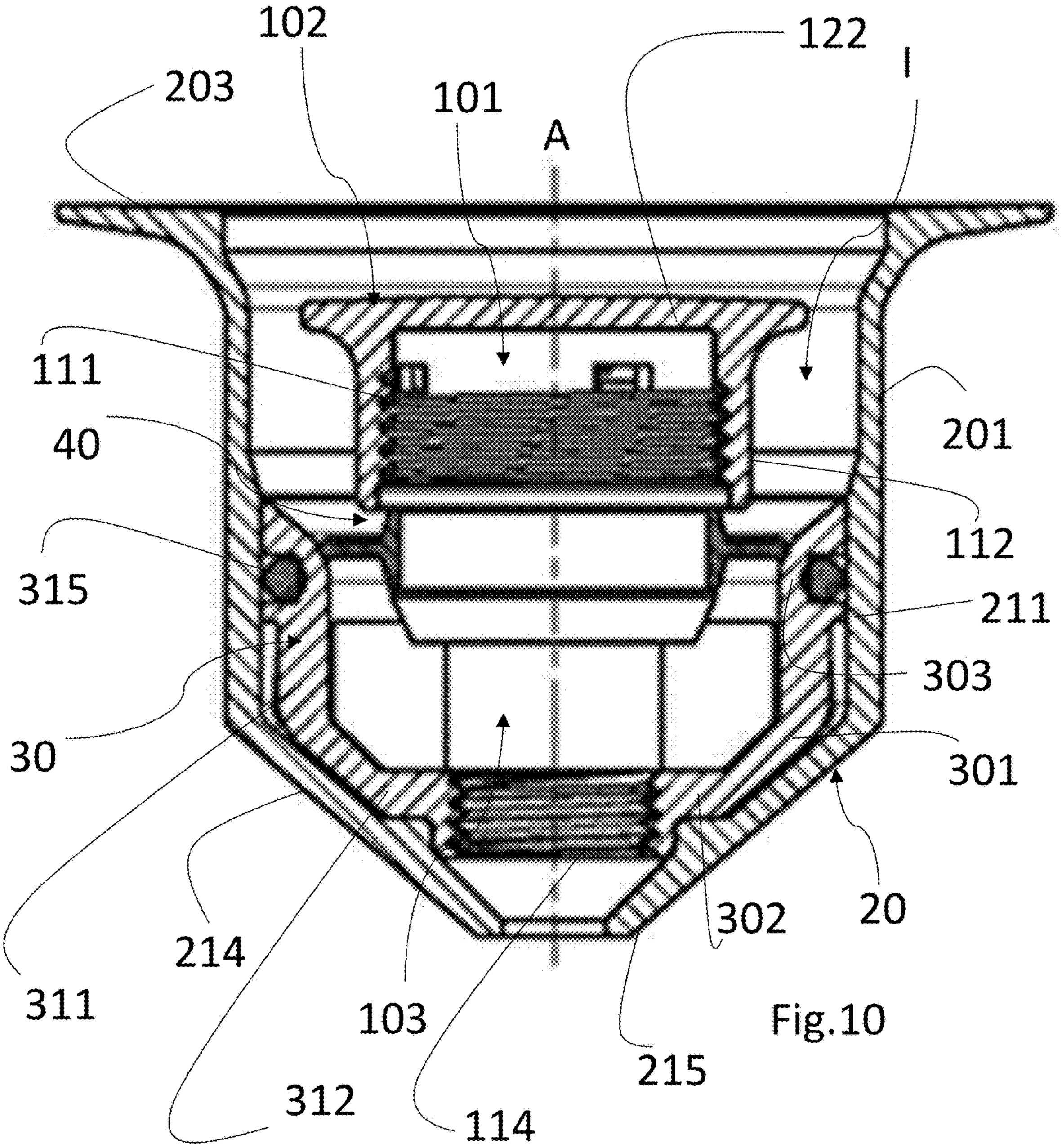
Figure 11:
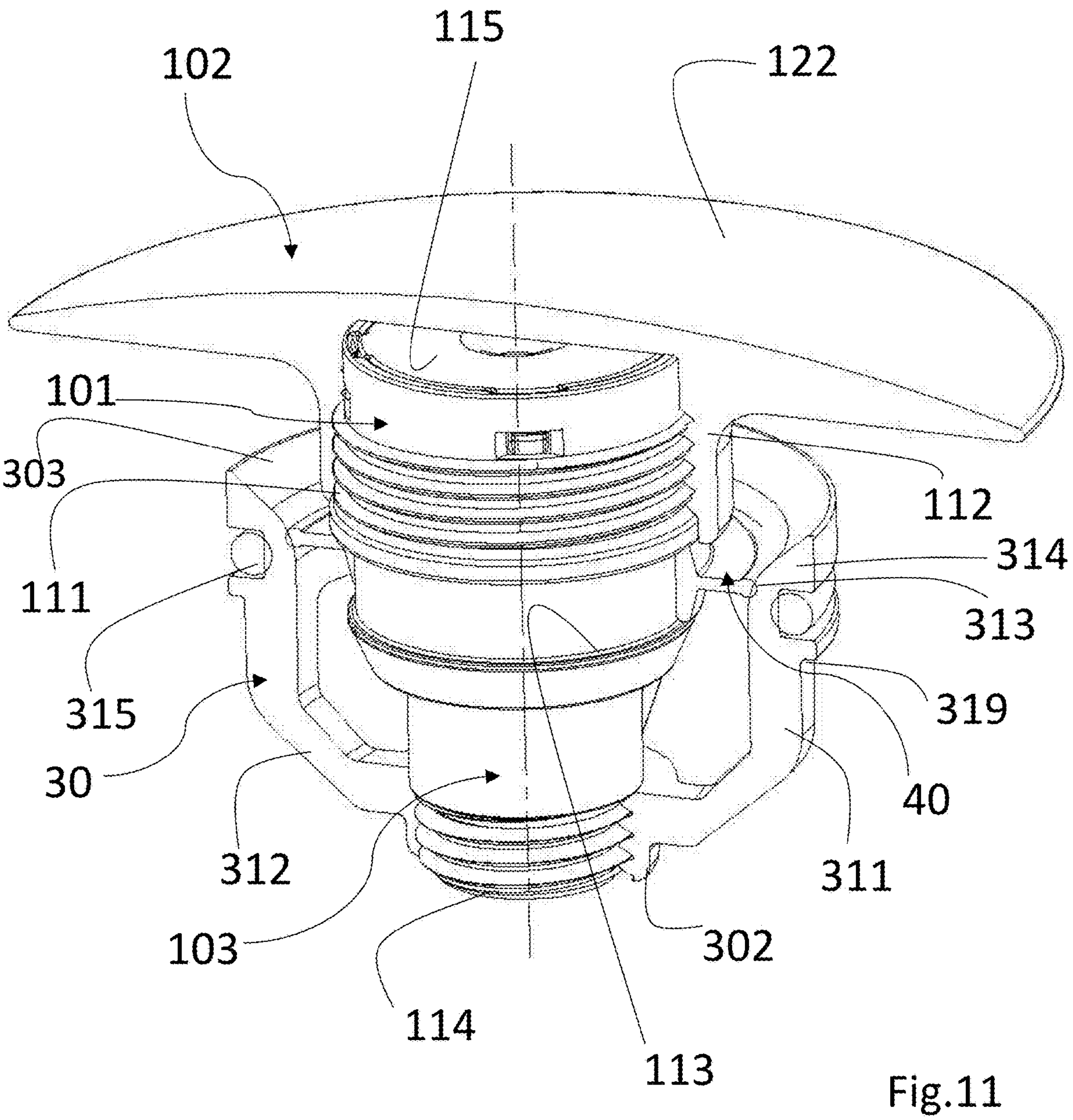
FIGS. 11 and 12 are partially sectioned perspective views of the closing and opening device object of the present invention, respectively not associated and associated with a drain.
Figure 12:
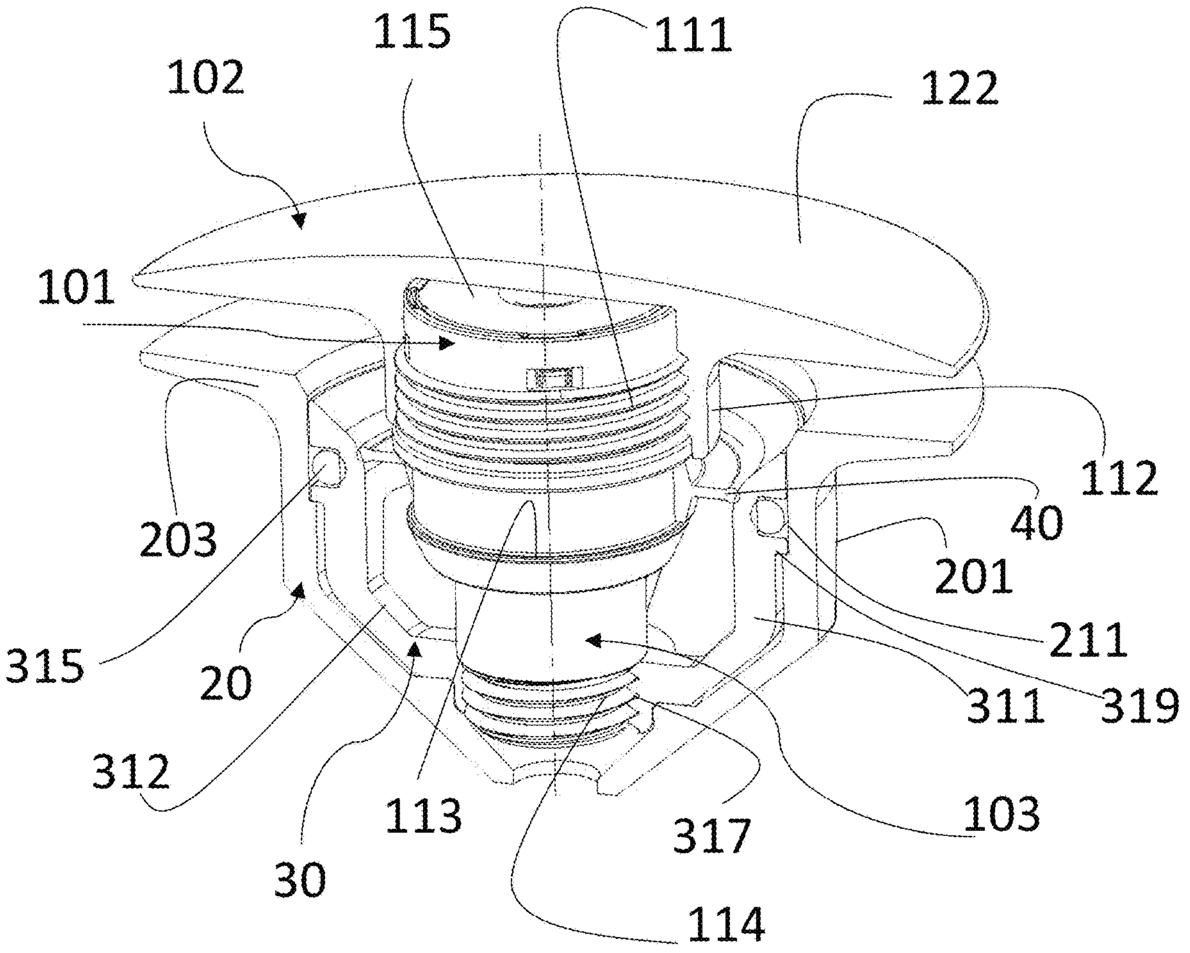
Figure 13:
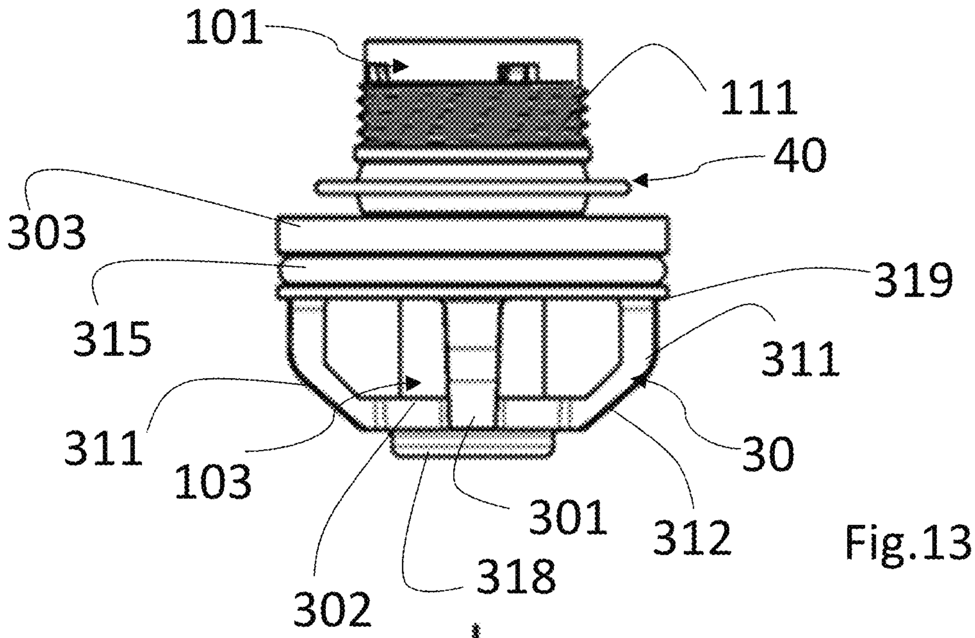
FIGS. 13 and 14 are perspective views of the closing and opening device of the present invention without the plug and not associated with a drain, respectively in the opened and closed waste outlet position.
Figure 14:
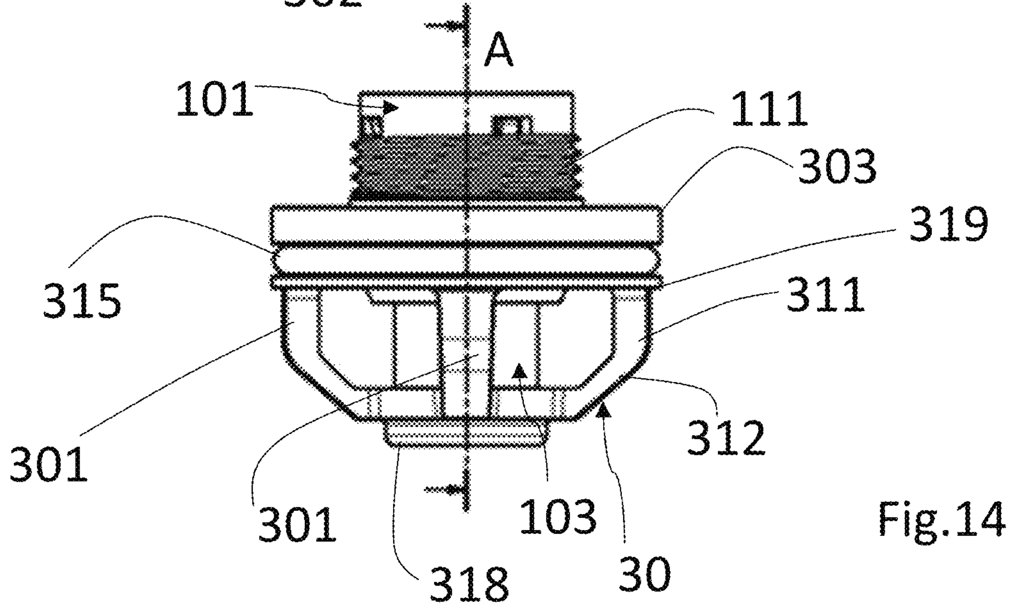
Figure 15:
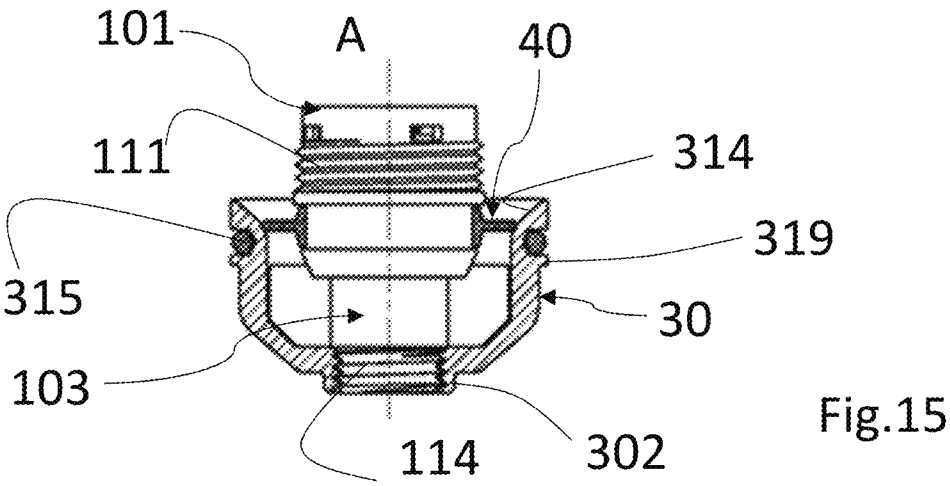
FIG. 15 is a partially sectioned view of the device of FIG. 14.

FIGS. 13-15, similarly to the pair of FIGS. 5 and 6 and the pair of FIGS. 9 and 10, show, for example, the translation of the hollow tubular body from the opened position (FIGS. 13, 5, 9) to the closed position (FIGS. 14 and 15, 6, 10) and the relative position of the gasket 40 with respect to the upper annular base 303.

The hollow tubular body 101 is movable in translation with respect to the stem 103 along a driving axis A of the opening and closing device 100, to allow the opening or closing of the entrance I of the drain 20.

As illustrated in the figures, the hollow tubular body 101 which, as mentioned, preferably accommodates the stem 103 therein, is cylindrical with an upper opening 116 and a lower opening 117, with reference to the direction identified by the driving axis A.

The upper opening 116 of the hollow tubular body 101, advantageously, is closed by a cover 115 shaped so as to at least partially close said opening and rest in abutment against the plug 102.

The stem 103 is inserted in the lower opening 117.

In the illustrated embodiments, the cover 115 is integral with the body 101 and, advantageously, forms an assembly therewith which is drivable by a user, in particular through an action on the plug 102, for opening and closing the waste outlet S, as will be clarified below.

In the embodiment in which the sealing element or annular gasket 40 is fitted on the outer shell surface of the hollow tubular body 101, the plug 102 can be absent or it can be envisaged that said cover 115 acts as the plug 102.

As illustrated in the figures, the plug 102 comprises a hollow cylindrical body 112 and, at one of the two bases of the cylinder, a flattened head 122.

The flattened head 122 can have any shape, preferably circular, and any diameter, greater or smaller than the diameter of the drain 20, depending on whether the plug and device 100, in the opened condition are made to remain outside or inside, and thus protruding or not protruding from the inner diameter of the drain 20.

An internal thread of the hollow cylindrical body 112 engages with a corresponding thread 111 provided on the outer shell surface of the hollow tubular body 101 to fix said plug 102 to said hollow tubular body 101.

It is, of course, possible to provide for the plug 102 to be coupled to the hollow tubular housing body 101 in any other manner, e.g., made in a single piece with said body 101 or glued or snap-connected.

An annular seat 113 is provided on the outer shell surface or outer tubular wall 110 of said hollow tubular body 101 for housing said sealing element or annular gasket 40.

Preferably, said annular seat 113 is provided near the lower opening 117 of the hollow tubular body 101, i.e. the end opposite that to which the plug 102 is fixed.

As illustrated in the figures, in the presence of a thread 111 coupling the plug 112, said annular seat 113 is provided between the lower opening 117 of the hollow tubular body 101, i.e. the end opposite that to which the plug 102 is fixed, and said thread 111 coupling the plug 102.

Said annular seat 113 is provided below a thread 111 for screwing the plug 115.

Said sealing element or annular gasket 40 is made as a ring 402 provided with a flattened radial flange 401.

It is possible to envisage other shapes for said sealing gasket 40.

The stem 103 has the free end, i.e. the end not inserted inside the hollow tubular housing body 101, threaded 114 so as to be able to couple with the lower annular base 302 of the hemispherical cage-like element 30 with several arms 301.

Said hemispherical cage-like element 30 with several arms 301 comprises a lower annular base 302 adapted to be coupled with said stem 103 and an upper annular base 303 joined by said arms 301.

The free edge, i.e., that which is not connected to the arms 301, of said upper annular base 303 is flared to form a peripheral annular rosette 314 below which said annular gasket 40 abuts on the inner wall 313 of said upper annular base 303 to hermetically close the entrance I of the drain 20 when said hollow tubular body 101 is in the closed position.

In fact, as illustrated in the figures at the upper edge, not connected to the arms, of said upper annular base 303, the inner wall of said upper annular base 303 is chamfered and below said chamfered wall the annular gasket 40 abuts against the inner wall 313 of said upper annular base 303 when said hollow tubular body 101 is in the closed position.

Externally, i.e. on the outer wall of said upper annular base 303, a sealing element is provided, such as a sealing O-ring 315 or the like.

In particular, externally, i.e. on the outer wall of said upper annular base 303, an annular housing 316 of said sealing element such as a sealing O-ring 315 or the like, is provided.

Said annular housing 316 of the sealing element such as a sealing o-ring 315 or the like, provided on the outer wall of said upper annular base 303, can be positioned below said rosette 314.

Said annular housing seat 316 is obtained in the thickness of the upper annular base 303.

Said O-ring 315 is positioned abutting against the inner wall 211 of the cylindrical body 201 of the drain 20, so as to allow a removable watertight housing of said hemispherical cage-like element 30 inside the drain 20 or so as to ensure the seal between the drain 20 and said hemispherical cage-like element 30 when the device (100) is removably positioned inside the drain 20 of a waste outlet S of a sanitary fixture.

At least a portion of said O-ring or sealing element 315 protrudes from said seat 316 so as to position itself against the inner wall 211 of the cylindrical body 201 of the drain 20.

In fact, the sealing element is positioned and dimensioned so that it makes contact and thus seals the gap between the inner wall 211 of the cylindrical body 201 of the drain 20 and seal the space between the inner wall of the drain 20 and the outer wall of the upper annular base 303.

In particular, the O-ring 315 ensures the seal even if it is positioned against a portion of the inner surface of the drain 20 which can have imperfections as it is not subject to treatments such as brushing and painting.

A seal is thus obtained between the hemispherical cage-like element 30 and the drain 20, which can be defined a 'static' seal, i.e. between two elements which, when the device 100 is mounted in the drain 20 and in operation, cannot be moved with respect to each other.

The closure of the waste outlet is obtained through the hermetic seal which is created between the hemispherical cage-like element 30, i.e. the removable insert, and the gasket 40. The seal via the gasket 40 is not achieved directly on the drain 20 inserted on the waste outlet but on the element 30 placed between the drain 20 and the gasket 40.

A seal is also obtained between the hemispherical cage-like element 30 and the gasket 40, which can be defined as a 'dynamic' seal, i.e. between two elements which, when the device 100 is mounted in the drain 20, can be moved with respect to each other, said gasket 40 being fitted on the hollow tubular body 101, movable from a position in which it is not abutting (opened waste outlet condition) against the inner wall 313 of the upper annular base 303 of the hemispherical cage-like element 30 positioned sealed in the drain 20 to a position in which it is abutting (closed waste outlet condition) against the inner wall 313 of the upper annular base 303 of the hemispherical cage-like element 30 positioned sealed in the drain 20, and vice versa.

Thanks to the present invention, a double seal is obtained.

The lower annular base 302 has a threaded inner wall 317 to accommodate, by screwing, the end thread 114 of the stem 103.

Advantageously, said lower annular base 302 has a peripheral radial thickening 318 which is also internally threaded, i.e. with a threaded inner wall, so as to increase the number of threads and make the tightening of the stem 103 on the hemispherical cage-like element 30 more secure, increasing the number of turns for screwing the end thread 114 of the stem 103 onto said lower annular base 302.

The device 100 can be mounted on a sanitary fixture as described below.

The hollow cylindrical body 201 of the drain 20 is housed in a hole obtained in the tub or tank of the sanitary fixture and communicating with a waste outlet duct.

The O-ring 315 is housed in the respective seat 316 provided on the hemispherical cage-like element 30.

The threaded end 114 of the stem 103 (associated with the hollow tubular body 101 provided with plug 102 and/or cover 115 and sealing gasket 40) is screwed into the lower base 302 of the hemispherical cage-like element 30.

The hollow tubular body 101 and the stem 103 are therefore inside the hemispherical cage-like element 30, in the space delimited by the arms 301.

The device 100 thus assembled is inserted inside the drain 20, with the upper annular base 303 facing upwards (i.e. towards the plug 102 or cover 115) and the lower base 302 facing the bottom of the drain 20, connectable to the waste outlet pipe, and at least the vertical segments 311 of the arms 301 abutting against the inner wall 211 of the body 201 of the drain so that the O-ring 315 abuts against the inner wall 211 of the drain 20, ensuring a stable and sealed positioning of the hemispherical cage-like element 30 inside the drain 20 itself.

The O-ring 315 hermetically closes the space of the entrance I, inside the drain 20, comprised between the inner surface 211 of the drain 20 and the outer surface of the hemispherical cage-like element 30, when at least part of the outer wall of the arms is in contact with the inner wall of the body 201 of the drain 20.

Advantageously, in order to avoid the pressure exerted on the plug 102 or cover 115 opening and/or closing the entrance I by means of the gasket 40, causing a movement of the hemispherical cage-like element 30 (and therefore of the device 100) inside the drain 20, causing, for example, a misalignment of the components of the device 100 with respect to the driving axis A, outside the lower edge of the upper annular base 303, from which the arms 301 depart, it is provided with an undercut 319 which abuts against a corresponding step 216 provided on the inner wall 211 of the drain 20.

Said undercut 319 is provided, for example, if the drains are used with a cylindrical body 20 without inclined extensions 214 such as, for example, the drain 20 illustrated in FIGS. 4, 5, 6, 7, 8, which extensions 214 are provided, in certain types of drains 20, at the free end of the cylindrical body 201 opposite the flange 203.

In an illustrated embodiment, said undercut 319 is provided below the housing seat 316 of the O-ring 315.

As illustrated in the figures, a lower annular abutment surface is provided at the lower edge of the upper annular base 303.

Said lower annular abutment surface protrudes radially outwards with respect to the outer wall of the arms 301 (i.e. the wall of the arms 301 facing the inner wall of the hollow cylindrical body 201 of the drain).

The inner wall 211 of the hollow cylindrical body 201 of the drain 20 is provided with an annular step 216 which protrudes radially inside the cavity of the drain 20.

Said annular surface is positioned abutting against said step 216 when the device 100 is positioned in a removable manner inside the drain 20 of a waste outlet S of a sanitary fixture.

If a drain is used which is provided with inclined extensions 214, at the end of the cylindrical body 201 opposite the flange 203 which converge in a ring 215, such as that depicted in FIGS. 3,9,10,12 a support of the hemispherical cage-like element 30 inside the drain 20 is made by means of the second folded segments 312 whose outer wall abuts against the inner wall of said extensions 214 of the drain 20 when the hemispherical cage-like element 30 carrying the hollow tubular body 101 with the gasket 40 and the stem 103, is housed inside the drain 20.

By means of a simple pressure of the user on the plug 102 or, in the absence thereof, on the cover 115, the relative translation of the hollow tubular body 102 with respect to the stem 103 along the driving axis A occurs between a first position of balance or of closure (FIGS. 6,7,10,11,12,14,15) in which a larger portion of the hollow tubular body 103 is stably inserted into the hollow tubular body 101, and a second position of balance or of opening (FIGS. 5,8,9,13), in which a smaller portion of the hollow tubular body 103 is stably inserted into the hollow tubular body 101.

In the closed condition, the entrance I for the passage of water or other liquid is hermetically closed thanks to the gasket 40 brought abutting with the inner wall 313 of the upper annular base 303 of the hemispherical cage-like element 30.

In the opened condition, the gasket 40 is raised and is spaced from the hemispherical cage-like element 30, leaving the entrance I free.

The device 100 comprises a mechanism (not illustrated) for the snap-movement of the hollow tubular body 101 by means of which it passes, on the push of an elastic element, from the lowered position to the raised position following a pressure manually exerted on the plug 102 or on a cover 115 or on a closing element of the upper opening 116 of said hollow tubular body 101. This type of mechanism is known.

A non-limiting example of such a mechanism, such as that depicted in FIGS. 1 and 2, comprises a shutter formed by a movable part, i.e., in the present invention, the hollow tubular body 101 slidingly engaged with a fixed part, i.e., the stem 103, adapted to be mounted on the hemispherical cage-like element 30.

In this mechanism example, a swivel part provided with an axial hole for housing a driving coil spring and a guide pin of spring are located inside the fixed part/stem 103.

In FIGS. 1 and 2, as described above, the movable part is indicated with reference 21, the fixed part with reference 22, the swivel part with 4, the spring with 5 and the pin with 6.

The fixed part has angled abutments and the swivel part in turn is provided with teeth, also inclined.

The movable part moves axially, i.e. vertically, with respect to the fixed part and is provided with longitudinal reliefs on its inner surface and, at its lower opening, an inner radial ring which forms an abutment edge against the inclined abutments of the fixed part.

The swivel part can perform an axial and rotary movement and is pushed against the fixed part by the effect of the spring.

In the opened position (e.g. FIG. 5), the drive spring is essentially uncompressed (barring the compressive action of the weight of the plug and possibly the residual water/liquid column) so as to carry the movable part, and thus the plug, in a maximum distancing condition from the fixed part and from the drain, with respect to the driving axis A, and the movable part is abutting against the fixed part by means of the lower inner abutment edge, which is abutting against the lower surface of the inclined abutments of the fixed part.

In this condition, thanks to the use of the mechanism described above, the gasket 40 of the device 100 which is the subject matter of the present invention is arranged far from the hemispherical cage-like element 30 so that the outflow of water or liquid through the hemispherical cage-like element 30 and the drain 20 is not obstructed.

The water or other liquid entering the entrance I can flow through the spaces between one arm 301 and the other of the hemispherical cage-like element 30 inside the body 201 of the drain 20 towards the waste outlet S.

Pressing the plug 102 and/or the cover 115 moves the movable part which is integral with the plug and/or cover axially towards the fixed part and rotates the swivel part, thanks to the combined action of the inclined abutments and the front teeth.

In the closed condition (FIG. 6), the movable part descends until the inner longitudinal reliefs abut against the inclined teeth.

In this condition, thanks to the use of the mechanism described above, the gasket 40 of the device 100 which is the subject matter of the present invention is arranged in contact with the hemispherical cage-like element 30 so that the outflow of water or liquid through the hemispherical cage-like element 30 and consequently the drain 20 is obstructed.

Of course, other snap-movement mechanisms can be provided.

As illustrated in the figures, the device 100 which is the subject matter of the present invention can comprise different types of plugs.

As illustrated in FIGS. 3, 8-10, the plug 102 is axially movable with respect to the hemispherical cage-like element 30 between a raised opened position in which said plug 102 is flush with the flange 203 of the drain 20, and the gasket 40 is spaced from the hemispherical cage-like element 30, allowing the opening of the entrance I and a lowered closed position in which said plug 102 is below the flange 203 of the drain 20, and the gasket 40 is positioned abutting against the inner wall 313 of the upper annular base 303 of the hemispherical cage-like element 30 allowing the closing of the entrance I.

It is evident in this embodiment that the diameter of the plug 102, in order to never protrude from the flange 203 of the drain 20 under any operating conditions, must have a diameter smaller than the inner diameter of the drain 20 and the entrance I.

As illustrated in FIGS. 4-7, 11, 12, the plug 102 is axially movable with respect to the hemispherical cage-like element 30 between a raised opened position in which said plug 102 is projecting above the flange 203 of the drain 20 (FIG. 5), and the gasket 40 is spaced apart from the hemispherical cage-like element 30, allowing the opening of the entrance I and a lowered closed position in which said plug 102 is flush with the flange 203 of the drain 20, and the gasket 40 is positioned abutting against the inner wall 313 of the upper annular base 303 of the hemispherical cage-like element 30 allowing the closing of the entrance I (FIG. 6).

It is evident in this embodiment that the diameter of the plug 102, is always projecting from the flange 203 of the drain 20, i.e. outside the entrance I, in any operating condition, having a diameter greater than the inner diameter of the drain 20 and the entrance I.

Furthermore, as illustrated in the figures, the device 100 which is the subject matter of the present invention can be housed in any type of drain 20.

As illustrated in FIGS. 4-8, the drain 20 can have a cylindrical body 201 with a peripheral flange 203 at one end and overflow holes 212 near the flange 203, and thread 213 on the outer shell wall.

As is evident from a comparison between FIG. 2 and FIG. 6, the presence of the hemispherical cage-like element 30 allows the holes 212 of the overflow to be positioned near the flange, at an extremely reduced distance h from the flange with respect to the distance H of traditional drains 3.

In fact, the device 100 which is the subject matter of the present invention makes it possible to have the closing/opening of the waste outlet S, inside the drain 20, in an extremely small space, allowing the use of drains 20 with overflow holes 212 even in sanitary fixtures having vertically reduced dimensions.

The device 100 which is the subject matter of the present invention can in fact be defined as space-saving in that it has a reduced vertical extension, which does not impede the flow of liquids through the overflow holes 212 positioned near the flange 203 of the drain 20.

As illustrated in FIGS. 3, 9 and 10, the drain 20 can have a cylindrical body 201 with a reduced extension, a peripheral flange 203 at one end, and at least one pair of inclined extensions 214 at the end of the cylindrical body 201 opposite the flange 203 which converge into a ring 215.

The concept of drain 20 must be considered in a broad sense, meaning any interface between the hemispherical cage-like element 30 of the opening and closing device 100 and the waste outlet entrance I selectively obstructable by the gasket 40.

As can be appreciated from what has been described, the opening and closing device 100 according to the invention has, thanks to the presence of the cage-like element 30, a versatile structure, which can be easily coupled to a plurality of different versions of plugs 102 and drains 20, each capable of offering a perfect seal of the gasket 40 on the hemispherical cage-like element 30 positioned in a drain 20 in a closed condition of the waste outlet S.

The presence of the hemispherical cage-like element 30 allows to have a closing gasket 40 positioned on the movable part or hollow tubular body 101 which allows or prevents the flow of water or other liquid even in the absence of a plug 102.

The presence of the hemispherical cage-like element 30 also allows to optimize the production of the drains 20, as it does not require the latter to be perfectly finished in order to ensure the closure of the waste outlet S.

Furthermore, the presence of the hemispherical cage-like element 30 means that the guide flaps adapted to slide along the inner walls of the drain are not required to maintain the coaxiality of the elements, which in the known devices determined the closing of the waste outlet, with the drain 20, because the closing of the entrance I is independent of the drain 20, being substantially made by the gasket 40 and the hemispherical cage-like element 30.

The device 100 guarantees optimal operation even after years of use, despite the fact that the device 100 works in an unfavorable environment, as it is subject to water or other liquids, dirt and limescale encrustations.

Furthermore, it allows for a quick replacement of the individual elements forming the device 100, in particular those which guarantee the hydraulic seal without making the replacement the entire piece 100 or the drain 20 necessary.

Reliability means that the device 100 in the closed condition always guarantees the correct hermetic seal with the drain 20, whatever its condition, whether new or worn and imperfect.

Obviously, it is possible to envisage device without gasket 40 should the entrance I be desired kept free at all times.

In practice, the materials used, as well as the contingent shapes and sizes, can be whatever according to the requirements without for this reason departing from the scope of protection of the following claims.

The invention claimed is:

1. A device for closing and opening by pressure a waste outlet of a sanitary fixture, the device being adapted to be housed inside a drain positionable in said waste outlet, said device comprising:

a hollow tubular body associated or associable integrally with a plug;

a stem at least partially housed inside said hollow tubular body, wherein the hollow tubular body comprises a tubular wall delimited at a first end by a lower opening and at a second end, opposite to the first end, by an upper opening, wherein said stem engages the lower opening, and the upper opening is at least partially engaged by said plug, said hollow tubular body being translatable with respect to the stem along a longitudinal driving axis of said device between a first position of balance or of closure of the waste outlet, in which a larger portion of the stem is stably inserted into the hollow tubular body, and a second position of balance or of opening of the waste outlet, in which a smaller portion of the stem is stably inserted into the hollow tubular body, wherein said device comprises a hemispherical cage-shaped element with a plurality of arms, inside which said hollow tubular body and said stem are housed, said hemispherical cage-shaped element being provided with an upper annular base facing the plug and with a lower annular base to which said stem is connected through its free end not housed in said hollow tubular body, said lower annular base being opposite said upper annular base, wherein each of said arms comprises at least two segments, which comprise a first segment which departs from a lower edge of the upper annular base and extends vertically towards the lower annular base, parallel to the longitudinal driving axis, and a second segment folded towards a center of said lower annular base, said second segment joining said first segment to said lower annular base, and wherein at least an outer wall of the first segments and/or said second segment of said arms is arched so as to facilitate a positioning in abutment against at least part of an inner wall of the drain; and further comprising an annular gasket fitted externally on the tubular wall of said hollow tubular body adapted to be positioned in abutment against an inner wall of said upper annular base to hermetically close an entrance to the drain when said device is housed sealingly in the drain and said hollow tubular body is in a closed position, a sealing element being provided on an outer wall of said upper annular base, said sealing element being positionable in abutment against the inner wall of the drain.

2. The device according to claim 1, wherein said sealing element is positioned in an annular housing provided on the outer wall of said upper annular base.

3. The device according to claim 1, wherein said upper annular base has a larger diameter than said lower annular base.

4. The device according to claim 1, wherein said plurality of arms consists of four arms, which are arranged perpendicular to each other.

5. The device according to claim 1, wherein said annular gasket is housed in an annular seat provided on a outer side of the tubular wall of the hollow tubular body adjacently to the lower opening.

6. The device according to claim 1, wherein the lower annular base of the hemispherical cage-shaped element has a threaded inner wall for screwing an end thread provided on the free end, which is not inserted inside the hollow tubular body, of the stem.

7. The device according to claim 6, wherein said lower annular base has a peripheral radial thickening with an internally threaded wall so as to increase a number of turns for screwing the stem on the lower annular base of said hemispherical cage-shaped element.

8. The device according to claim 1, wherein a free edge, which is not connected to said arms, of said upper annular base is flared to form a peripheral annular rosette below which said annular gasket abuts on the inner wall of said upper annular base to hermetically close the entrance of the drain when said hollow tubular body is in the closed position.

9. The device according to claim 1, wherein inside said hollow tubular body and/or on said stem, means are provided for a snap movement of said hollow tubular body with respect to said stem for an automatic passage, upon a push of an elastic element, from said first position of balance or of closure of the waste outlet, to said second position of balance or of opening of the waste outlet and vice versa, passing through a position of maximum momentary insertion of the stem into the hollow tubular body.

10. An assembly for closing and opening by pressure a waste outlet of a sanitary fixture comprising:

a closing and opening device according to claim 1; and a drain, wherein the drain comprises a hollow cylindrical body ending at a bottom with an opening connectable to a waste outlet pipe and at a top with an annular flange delimiting an entrance for a passage of a liquid into the cylindrical body.

11. The assembly according to claim 10, wherein said drain is provided with overflow holes adjacently to said annular flange.

12. A device for closing and opening by pressure a waste outlet of a sanitary fixture, the device being adapted to be housed inside a drain positionable in said waste outlet, said device comprising:

a hollow tubular body associated or associable integrally with a plug;

a stem at least partially housed inside said hollow tubular body, wherein the hollow tubular body comprises a tubular wall delimited at a first end by a lower opening and at a second end, opposite to the first end, by an upper opening, wherein said stem engages the lower opening, and the upper opening is at least partially engaged by said plug, said hollow tubular body being translatable with respect to the stem along a longitudinal driving axis of said device between a first position of balance or of closure of the waste outlet, in which a larger portion of the stem is stably inserted into the hollow tubular body, and a second position of balance or of opening of the waste outlet, in which a smaller portion of the stem is stably inserted into the hollow tubular body, and wherein said device comprises a hemispherical cage-shaped element with a plurality of arms, inside which said hollow tubular body and said stem are housed, said hemispherical cage-shaped element being provided with an upper annular base facing the plug and with a lower annular base to which said stem is connected through its free end not housed in said hollow tubular body, said lower annular base being opposite said upper annular base;

further comprising an annular gasket fitted externally on the tubular wall of said hollow tubular body adapted to be positioned in abutment against an inner wall of said upper annular base to hermetically close an entrance to the drain when said device is housed sealingly in the drain and said hollow tubular body is in a closed position, a sealing element being provided on an outer wall of said upper annular base, said sealing element being positionable in abutment against an inner wall of the drain, wherein the sealing element is positioned in an annular housing provided on the outer wall of the upper annular base, and wherein a lower edge of the upper annular base, from which the arms depart, is provided externally with an undercut adapted to be positioned in abutment against a corresponding step provided on the inner wall of the drain when said hemispherical cage-shaped element is housed in said drain.

13. The device according to claim 12, wherein said undercut is provided below an annular housing seat of the sealing element, which is configures as an O-ring.

* * * * *